(12) United States Patent
Abdelli

(10) Patent No.: US 11,480,429 B2
(45) Date of Patent: Oct. 25, 2022

(54) METHOD OF DETECTING PROXIMITY TO THE GROUND OF A SIDE ARRANGEMENT ON AN AIRCRAFT, AND AN AIRCRAFT

(71) Applicant: AIRBUS HELICOPTERS, Marignane (FR)

(72) Inventor: Kamel Abdelli, Marseilles (FR)

(73) Assignee: Airbus Helicopters, Marignane (FR)

( * ) Notice: Subject to any disclaimer, the term of this patent is extended or adjusted under 35 U.S.C. 154(b) by 304 days.

(21) Appl. No.: 16/704,391

(22) Filed: Dec. 5, 2019

(65) Prior Publication Data
US 2020/0217658 A1    Jul. 9, 2020

(30) Foreign Application Priority Data

Dec. 19, 2018  (FR) ...................................... 1873390

(51) Int. Cl.
*G01C 5/00* (2006.01)
*B64C 27/26* (2006.01)
*B64D 45/04* (2006.01)
*G08G 5/00* (2006.01)

(52) U.S. Cl.
CPC .............. *G01C 5/005* (2013.01); *B64C 27/26* (2013.01); *B64D 45/04* (2013.01); *G08G 5/0021* (2013.01); *G08G 5/0086* (2013.01)

(58) Field of Classification Search
CPC .................................................... G01C 5/005
See application file for complete search history.

(56) References Cited

U.S. PATENT DOCUMENTS

| 5,892,462 A | * | 4/1999 | Tran ..................... G05D 1/0646 340/961 |
| 6,012,001 A | | 1/2000 | Scully |
| 9,229,101 B2 | * | 1/2016 | Kirk ...................... G08G 5/045 |
| 2007/0050140 A1 | | 3/2007 | Matuska et al. |
| 2008/0180310 A1 | | 7/2008 | Reich |
| 2010/0161174 A1 | | 6/2010 | Yates et al. |
| 2010/0305784 A1 | | 12/2010 | Anderson |

(Continued)

FOREIGN PATENT DOCUMENTS

| JP | 2003534987 A | * | 11/2003 |
| WO | 2015134078 A1 | | 9/2015 |

(Continued)

OTHER PUBLICATIONS

French Search Report for French Application No. FR1873390, Completed by the French Patent Office, dated Oct. 24, 2019, 12 pages.

*Primary Examiner* — Jean Paul Cass
(74) *Attorney, Agent, or Firm* — Brooks Kushman P.C.

(57) ABSTRACT

A method of assisting in piloting an aircraft having a fuselage, the aircraft having a first side arrangement and a second side arrangement, which arrangements are disposed laterally on either side of the fuselage, and each of them participates in the movement of the aircraft. During an assistance phase, the method includes the following steps: measuring a value of a first ground clearance of the first side arrangement and a value of a second ground clearance of the second side arrangement; and displaying on a screen at least one symbol that varies as a function of the variation in the value of the first ground clearance and/or of the variation in the value of the second ground clearance.

18 Claims, 5 Drawing Sheets

(56) References Cited

U.S. PATENT DOCUMENTS

| | | |
|---|---|---|
| 2014/0061367 A1 | 3/2014 | Fink et al. |
| 2014/0062756 A1* | 3/2014 | Lamkin ................ G01S 13/933 342/29 |
| 2014/0108442 A1* | 4/2014 | Paglia ................ G06F 16/9535 707/758 |
| 2015/0073628 A1 | 3/2015 | Nicholls et al. |
| 2015/0235560 A1 | 8/2015 | Enns et al. |
| 2016/0351061 A1* | 12/2016 | Lamkin ................ G08G 5/0021 |
| 2018/0075762 A1* | 3/2018 | Gadgil .................... G08G 5/04 |

FOREIGN PATENT DOCUMENTS

| | | | | |
|---|---|---|---|---|
| WO | WO-2018177032 A1 | * | 10/2018 | ............ G06F 16/22 |
| WO | WO-2018230552 A1 | * | 12/2018 | ............ H04N 5/272 |

\* cited by examiner

METHOD OF DETECTING PROXIMITY TO THE GROUND OF A SIDE ARRANGEMENT ON AN AIRCRAFT, AND AN AIRCRAFT

CROSS REFERENCE TO RELATED APPLICATIONS

This application claims priority to French patent application No. FR 18 73390 filed on Dec. 19, 2018, the disclosure of which is incorporated in its entirety by reference herein.

FIELD OF THE INVENTION

The present invention relates to a method of detecting proximity to the ground of a side arrangement on an aircraft., and also relates to an aircraft applying this method.

The project leading to this patent application received funding from the European Union Framework Programme for Research and Innovation Horizon 2020, through the grant agreement CleanSky 2 No. "GAM-FRC-2014-001 Issue E".

An aircraft can include a fuselage that extends longitudinally from a nose to a rear end. In addition, the aircraft can include a first side arrangement and a second side arrangement that are disposed laterally on either side of the fuselage so that each of them participates in the movement of the aircraft. Each side arrangement may, for example, comprise a fixed wing arrangement, thereby participating inn, providing the aircraft with lift, and/or a puller or pusher propeller.

For example, a hybrid helicopter may include a fuselage carrying a rotor that participates in providing lift for it or indeed in providing propulsion for it. In addition, the hybrid helicopter has at least one thruster carried by at least one wing. Such a thruster is equipped with a puller or pusher side propeller. For example, a hybrid helicopter includes two side propellers disposed laterally on either side of the fuselage, each side propeller being carried by at least one wing.

Such a side propeller has blades that are driven in rotation by a propeller shaft that is optionally carried by a nacelle of the thruster. For convenience, such blades are referred to as "side blades" so as to distinguish between them and the blades of the rotor, where applicable. For example, two nacelles carrying side blades are positioned transversely on either side of the fuselage, each at a respective wingtip, and the nacelles are positioned longitudinally between the cockpit of the aircraft and its rear and.

Due to their configurations, the side blades, or indeed the wings might come into contact with the ground or with elements present under the aircraft on landing or on takeoff.

A pilot on the aircraft can find it difficult to see the propellers or indeed the wings and to assess the proximity to such elements or to the ground of the side blades or of the wings. The side blades of a propeller and/or the tips of the wings can even be outside the field of vision of a pilot.

That difficulty in assessing the positions of the side blades and/or of the wings relative to any obstacles can be stressful during the takeoff and landing phases that induce a considerable workload for the pilot.

BACKGROUND OF THE. INVENTION

Document WO 2015/134078 discloses a system for guiding an airplane in order to avoid a collision with the wingtips of the airplane. That system comprises at least one camera generating a stream of images of the outside environment and of a wingtip, as well as a screen and a computer. The computer is programmed to display the images on the screen and to superimpose on the images a representation of the projected future location of said wingtip.

Document US2018/075762 discloses a system for detecting obstacles.

Document US2014/062756 discloses a system for detecting obstacles on the ground.

Documents US2007/0501140, U.S. Pat. No. 5,012,001, US2015/073628, US2010/305784, US2010/161174, US2014/061367, US2008/180310, and US2015/235560 are also known.

OBJECT AND SUMMARY OF THE INVENTION

An object of the present invention is therefore to propose a method that makes it possible to facilitate the work of a pilot of an aircraft, and in particular of a hybrid helicopter provided with at least one side propeller, in particular during landing and takeoff phases.

To this end, the invention provides a method of assisting in piloting an aircraft having a fuselage that extends longitudinally from a nose towards a rear end, the aircraft having a first side arrangement and a second side arrangement, which first side, and second side, arrangements are disposed laterally on either side of the fuselage, and participate in the movement of the aircraft.

During an assistance phase, the method includes the following steps:

measuring a value of a first ground clearance of the first side arrangement and a value of a second ground clearance of the second side arrangement;

displaying on a screen at least one symbol that varies as a function of the variation in said value of the first ground clearance and/or of the variation in said value of the second ground clearance.

The expression "participate in the movement of the aircraft" means, in the context of an aircraft, that a side arrangement makes it possible to provide, at least partially, lift for the aircraft and/or propulsion for advancing the aircraft in at least one direction. Thus, a side arrangement may comprise at least one fixed wing arrangement and/or a rotor and optionally a propeller, for example.

The expression "at least one symbol that varies as a function of the variation in said value of the first ground clearance and/or of the variation in said value of the second ground clearance" means, in particular, that each symbol generated varies when at least the value of the first ground clearance varies or when at least the value of the second ground clearance varies. For example, a symbol may vary only when the first ground clearance varies, another symbol may vary only when the second ground clearance varies and another symbol may vary when the first ground clearance varies or the second ground clearance varies.

Independently of this aspect, a symbol varies by having a shape and/or an appearance and/or a position on the screen that change on order from a computer. For example, a symbol may vary by having a dimension and/or a color that vary, and another symbol may vary by having a position and/or a color that vary.

The method is applied at least during an assistance phase. Such an assistance phase may be triggered on request by a pilot by the pilot operating a touch, voice, or eye control, for example, or may be implemented automatically by a computer. In one example, a computer may apply this method at least during a landing or takeoff phase. Such a landing or takeoff phase may be detected by monitoring a speed of advance and/or a height of the aircraft and/or by monitoring the position of a retractable undercarriage, for example.

The method therefore makes provision to measure a ground clearance of each side arrangement during the assistance phase. For example, the height of a nacelle of a thruster of a side arrangement is measured by means of a sensor or of a set of sensors.

A computer processes the values of the ground clearances and, at the end of the processing, encodes an order given via a control signal. The order is transmitted to the screen, which generates at least one symbol and displays it on a page, each symbol visually illustrating at least one of the first and second ground clearances.

A pilot can then look at the screen to assess the positions of the side arrangements and, where applicable, of propellers relative to obstacles situated under the aircraft, and in particular relative to the ground, without needing to perform contortions to look at the side arrangements directly. By observing each symbol on the screen, the pilot can decide, if necessary, to take corrective piloting action, e.g. by changing the roll angle of the aircraft.

This method is relatively simple since it does not require cameras filming the surrounding environment of the aircraft, unlike in Document WO 2015/134078.

This method may also have one or more of the following additional characteristics.

In one aspect, or measuring the value of the first ground clearance and the value of the second ground clearance, the method may include the following steps:
  acquiring at least one first measurement signal with a first sensor, which first measurement signal carries a first piece of information that is an image of the value of the first ground clearance, and acquiring at least one second measurement signal with a second sensor, which second measurement signal carries a second piece or information that is an image of the value of the second ground clearance; and
  determining the value of the first ground clearance by processing said at least one first measurement signal, and the value of the second ground clearance by processing said at least one second measurement signal.

In one aspect, for measuring the value of the first ground clearance and the value of the second ground clearance., the method may include the following steps:
  acquiring a plurality of first measurement signals with a plurality of first sensors of the first ground clearance, and acquiring a plurality of second measurement signals with a plurality of second sensors of the second ground clearance;
  conditioning said first measurement signals and said second measurement signals; and
  consolidating said first measurement signals and said second measurement signals following said conditioning via a voting method for obtaining respectively the value of the first ground clearance and the value of the second ground clearance.

Thus, the aircraft may be provided with at least one set of sensors per side arrangement.

Each sensor in a set of sensors of a side arrangement generates for example an electrical signal that varies as a function of the height of said sensor. During a processing step, a conditioner may then condition said signal to obtain a usable electrical magnitude, it being possible for the conditioning to contain usual methods such as converting electric current to voltage, amplification, filtering, etc. A conditioner may be incorporated into the sensor or into a computer.

In addition, the conditioned signal may be digitized by a converter of the sensor or of the computer.

In an example, each sensor generates a raw electrical measurement signal, conditions the raw electrical measurement signal to obtain a conditioned measurement signal in electrical form, and then digitizes the conditioned measurement signal in electrical form to obtain a conditioned measurement signal in digital form. The conditioned measurement signal in digital form is transmitted to the computer via a network, such as, for example, a Controller Area Network (CAN) bus.

At least one of the preceding processing steps may be performed by the computer.

In addition, when a plurality of sensors in a same set of sensors are present, the processing may include a consolidation step that is usual for safety or backup purposes, via a voting principle, e.g. in order to determine whether a defective sensor is present.

By way of illustration, the computer receives three first signals in digital form. The converter then conventionally converts the three first signals in digital form into three heights expressed in meters or in feet, for example, and then selects a height for the first ground clearance via a conventional voting method. Similarly, the computer receives three second signals in digital form. The converter then converts the three second signals in digital form into three heights expressed in meters or in feet, for example, and then selects a height for the second ground clearance via a conventional voting method.

The computer then controls the screen to generate and display each symbol requested on said screen as a function of the height of the first ground clearance and of the height of the second, ground clearance.

In one aspect, the aircraft may be provided with a plurality of first sensors, each emitting a first measurement signal, and the plurality of first sensors comprising at least two first sensors that a re dissimilar and/or disposed in mutually different zones of the first side arrangement, and the aircraft may be provided with a plurality of second sensors each emitting a second measurement signal, and the plurality of sensors containing at least two second sensors that are dissimilar and/or disposed in mutually different zones of the second side arrangement.

The term "dissimilar" means that two sensors measuring the same piece of data operate using different techniques. For example, one sensor in a set of sensors is a sensor known as a lidar (light detection and ranging) sensor, and another sensor in the set of sensors is a radio altimeter, and a last sensor of the set of sensors is an ultrasound sensor.

Additionally or alternatively, the sensors of the same side arrangement may be placed in mutually different zones. For example, one or more sensors of a side arrangement may be placed under a nacelle of a thruster, one or more sensors of said side arrangement may be placed on one side of the nacelle of a thruster, and/or one or more sensors of said side arrangement may be placed under a wing.

Thus, the sensors of a side arrangement may be chosen to be dissimilar and to be placed in different configurations so as to optimize the reliability of the determined height on which at least one symbol displayed on the screen is dependent.

In one aspect, each symbol may be displayed continuously, at least when a page containing said symbol is active on the screen.

Alternatively, the displaying of said at least one symbol may be dependent on detection of at least one of following two events, or indeed on simultaneous detection of both of the following two events:

detection that a retractable undercarriage of the aircraft is deployed; and detection that the value of the first ground clearance, is less than a threshold height or that the second ground clearance is less than the threshold height.

In this variant, the screen displays the symbol(s) relating to the first ground clearance and to the second ground clearance only in the event of risk of crashing, namely in the event of proximity to the ground.

In one aspect, the method may include, a step of determining a roll set value to be complied with, e.g. so that the value of the first ground clearance and the value of the second ground clearance are kept under control during the procedure for landing on a slope. For example, when maneuvering with a view to landing on sloping terrain, the pilot thus has accurate knowledge of the ground clearances, in particular, while the aircraft is horizontal, after a portion of wheel or skid undercarriage has come into contact with the ground on the uphill portion of the slope, so as then to control the roll cyclic pitch of a rotor while being aware of the ground clearance to a downhill port ion of the slope before an undercarriage comes into contact with said downhill portion of the ground. For example, in a usual method, said at least one symbol comprises a central symbol that moves along a reference segment, e.g. a circular arc shaped reference segment, the positioning of said central symbol along the reference segment being a function of the roll set value.

Therefore, the value of the first ground clearance and the value of the second ground clearance make it possible to define a roll set value to be applied so that the aircraft is substantially parallel to the ground, this roll set value being easily identifiable by a pilot by observing the position of the central symbol along the reference segment.

For example, the central symbol is placed at the center of the reference segment when the value of the first ground clearance and the value of the second ground clearance are identical. When they are not identical, the central symbol moves away from the center of the reference segment, the gap between the central symbol and the center of the reference segment increasing proportionally to the difference between the value of the first ground clearance and the value of the second ground clearance. For example, the central symbol moves away from the center of the reference segment in a direction corresponding to the direction in which the pilot needs to move a control in order to apply the roll set value.

In one aspect, the central symbol may comprise a first portion and a second portion that represent respectively the first ground clearance and the second ground clearance, a background of the first portion and a background of the second portion varying as a function respectively of the value of the first ground clearance and of the value of the second ground clearance.

The color and/or the appearance of each portion may vary as a function of the value of the corresponding ground clearance. For example, each portion may have a background that has a color varying from green to red via an amber color while the corresponding ground clearance is decreasing.

In one aspect, said at least one symbol may comprise a first symbol and a second symbol, the first symbol extending in a direction from a horizon segment representing the horizon of an artificial horizon to a first end over a first length that is a function of the value of the first ground clearance, and the second symbol extending in said direction from the horizon segment to a second end over a second length that is a function of the value of the second ground clearance.

The length of a symbol between the horizon segment and its end may be proportional to the value of the corresponding ground clearance.

Thus, a pilot can easily assess the position of the aircraft with respect to the ground by viewing the length of the first symbol and the length of the second symbol.

Optionally, the first symbol has a background that varies as a function of the value of the first ground clearance and the second symbol has a background that varies as a function of the value of the second ground clearance.

The color and/or the appearance of the background of each symbol may vary at least as a function of the value of the corresponding ground clearance. For example, each background may have a color varying from green to red via an amber color while the corresponding ground clearance is decreasing.

Optionally, the method may include a step of displaying a ground segment connecting the first end to the second end.

Such a ground segment diagrammatically illustrates where the ground is situated relative to the aircraft.

In one aspect, with the aircraft being provided with at least one undercarriage that can be compressed so that it is either in a compressed state or in a non-compressed state, said method includes the following steps:

determining that said at least one undercarriage is in said compressed state or in said non-compressed state; and assigning to said at least one symbol an appearance that varies while said at least one undercarriage is going from said compressed state to said non-compressed state and vice versa.

This method may include a step of detecting a compressed state of an undercarriage that is reached on the ground or a non-compressed state an undercarriage that is reached in flight. A background of at least one symbol may be controlled to vary as a function of whether an undercarriage is in said compressed state or in said non-compressed state. The color effects of or the graphic additions to a symbol may vary for this purpose, in order to give an additional visual indication signaling that an undercarriage is compressed and is thus in contact with the ground or example, the background of a first symbol may vary while a first undercarriage present on a first side of the aircraft is going from a compressed state to a non-compressed state and vice versa. Similarly, the background of a second symbol may vary while a second undercarriage present on a second side of the aircraft is going from a compressed state to a non-compressed state and vice versa. The color effects of or the graphic additions to a symbol and, for example, the central symbol, may be adapted to take into account a central third undercarriage.

In addition to providing the method, the invention also provides an aircraft having a fuselage that extends longitudinally from a nose towards a rear end, said aircraft having a first side arrangement and a second side arrangement, which first side and second side arrangements are disposed laterally on either side of the fuselage, and each of them participates in the movement of the aircraft.

The aircraft is provided with at least one first sensor emitting a first signal relating to the value of a first ground clearance of the first side arrangement, said aircraft being provided with at least one second sensor emitting a second signal relating to the value of a second ground clearance of the second side arrangement, said aircraft being provided with a screen and with a computer, said computer being connected to each first sensor and to each second, sensor, and to the screen, and being configured to apply the method of the invention by determining said value of the first ground clearance and said value of the second ground clearance, said computer transmitting a control signal to the screen to display said at least one symbol.

The computer may comprise a single unit or a plurality of units. For example, the computer comprises a management central unit that communicates with the sensors and a unit forming a portion of a multifunction display. At least one unit may be redundant to back up the information.

For example, a unit may process the, data from the sensors and communicate with a unit dedicated to display. In another example, a unit dedicated to display also processes the data from the sensors.

The aircraft may be provided with at least two said first sensors that are dissimilar and/or disposed in mutually different zones of the first side arrangement, said aircraft being provided with at least two said second sensors that are dissimilar and/or disposed in mutually different zones of the second side arrangement.

At least one first sensor or at least one second sensor may comprise a lidar sensor or a radio altimeter, or indeed an ultrasound sensor.

In one aspect, the aircraft may be provided with a retractable undercarriage.

In one aspect, the first side arrangement may comprise a first fixed wing arrangement carrying a first propeller, the second side arrangement comprising a second fixed wing arrangement carrying a second propeller.

BRIEF DESCRIPTION OF THE DRAWINGS

The invention and its advantages appear in greater detail from the following description of examples given by way of illustration with reference to the accompanying figures, in which.

MORE DETAILED DESCRIPTION

Elements that are present in more than one of the figures are given the same references in each of them Three mutually orthogonal directions $\underline{X}$, $\underline{Y}$, and $\underline{Z}$ are shown in some of the, figures.

The first direction $\underline{X}$ is referred to as the "longitudinal" direction. The term "longitudinal" relates to any direction parallel to the first direction $\underline{X}$.

The second direction $\underline{Y}$ is referred to as the "transverse" direction. The term "transverse" relates to any direction parallel to the second direction $\underline{Y}$. The term "laterally" also refers to the second direction $\underline{Y}$.

Finally, the third direction $\underline{Z}$ is said to be in elevation. The term "in elevation" relates to any direction parallel to the third direction $\underline{Z}$.

Figure 1:
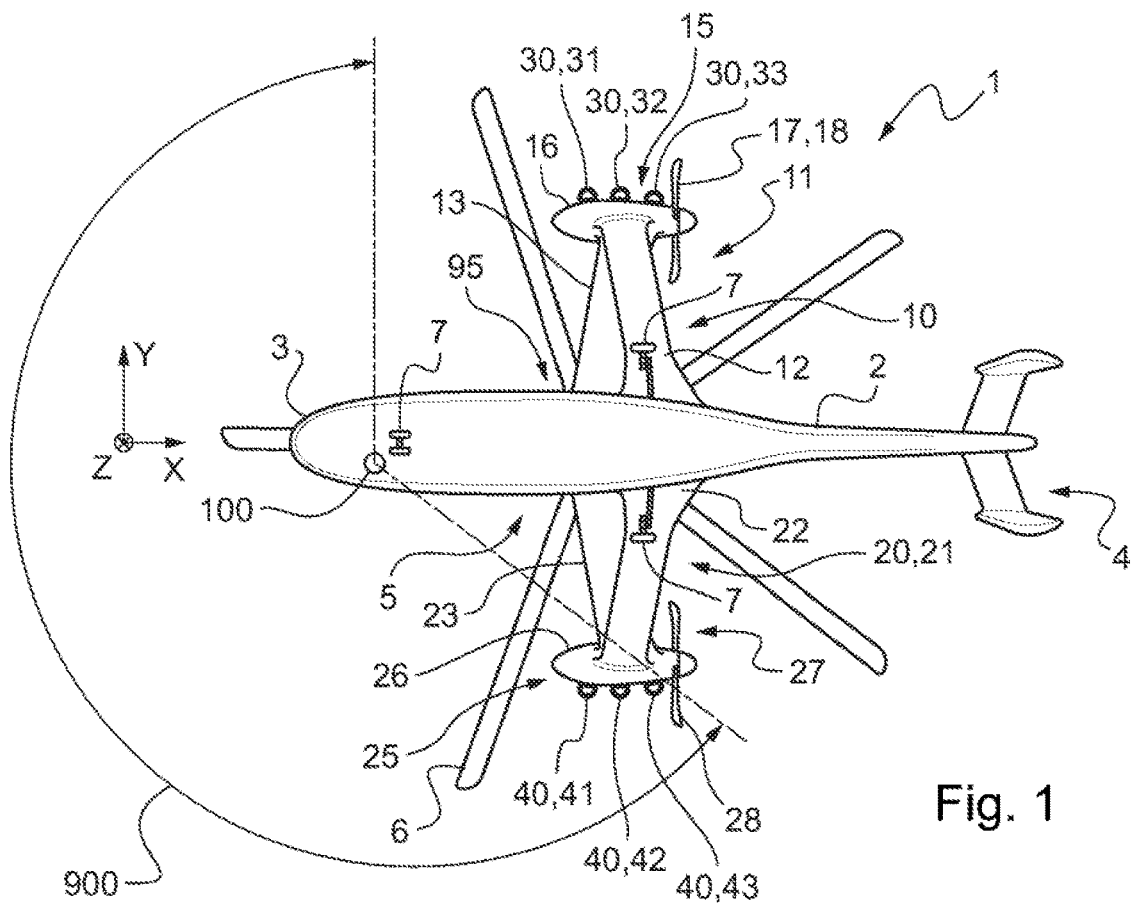
FIG. 1 is a view from below of an aircraft of the invention.

FIG. 1 shows an aircraft 1 of the invention

This aircraft 1 is provided with a fuselage 2 that extends longitudinally along the longitudinal axis X from a nose 3 to a rear end 4, laterally along the transverse axis Y from a first flank to a second flank, and in elevation along the axis in elevation Z from a bottom to a top.

The aircraft may include a rotor 5 provided with blades 6, the rotor being arranged above the fuselage 2.

In addition, the aircraft 1 includes a first side arrangement 10 and a second side arrangement 20, which first side and second side arrangements are disposed laterally along the transverse axis Y on either side of the fuselage 2, and each of them participates in the movement of the aircraft 1. The first side arrangement 10 extends laterally from the first flank of the fuselage and the second side arrangement 20 extends laterally from the second flank of the fuselage.

Each side arrangement may comprise a fixed wing arrangement and may indeed further comprise at least one thruster. The aircraft 1 may thus be a hybrid aircraft.

Thus, the first side arrangement 10 may comprise a first fixed wing arrangement 11 carrying a first thruster 15. Such a first thruster 15 may comprise a first nacelle 16 carrying a first propeller 17 provided with blades 18. In the example shown in FIG. 1, the first fixed wing arrangement 11 has a first lower wing and a first upper wing 13, the first nacelle being fastened to the tips of the first lower wing 12 and of the first upper wing 13. Also in this example., the first propeller is positioned on the same side as the trailing edges of the first lower wing 12 and of the first upper wing 13. The first propeller may be a puller or a pusher propeller.

Similarly, the second side arrangement 20 may comprise a second fixed wing arrangement 21 carrying a second thruster 25. Such a second thruster 25 may comprise a second nacelle 26 carrying a second propeller 27 provided with blades 28. In the example shown in FIG. 1, the second fixed wing arrangement 21 has a second lower wing 22 and a second upper wing 23, the second nacelle being fastened to the tips of the second lower wing 22 and of the second upper wing 23. Also in this example., the second propeller is positioned on the same side as the trailing edges of the second lower wing 22 and of the second upper wing 23. The second propeller may be a puller or a pusher propeller.

Other configurations are possible without going beyond the ambit of the invention. For example, each side arrangement may comprise a single wing.

In addition, a power plant 95 may set in motion the various rotary members of the, aircraft, and in particular the rotor 5 of the rotary wing, the first propeller 17 and the second propeller 27.

In another aspect, the aircraft 1 has landing gear. Said landing gear may comprise at least one, undercarriage 7 that may be compressed on coming into contact with the ground and/or be retractable, namely an undercarriage that can, in flight, be retracted at least partially into a landing-gear bay and be deployed from the landing-gear bay before landing. Usual sensors may make it possible to determine when an undercarriage is deployed. Usual sensors may make it possible to determine that an undercarriage is compressed and/or not compressed, such as, for example, pressure sensors, Hall effect sensors, etc.

In the example, shown, the fuselage carries a central undercarriage, the first lower wing carries a first undercarriage, and the second lower wing carries a second undercarriage.

In addition, the fuselage may include a cockpit from which a pilot 100 can pilot the aircraft. Due to the position of the pilot, at least the first side arrangement is not entirely within the field of vision 900 of the pilot.

Therefore, the aircraft 1 includes an innovative piloting assistance system enabling the pilot to assess the minimum ground clearance, of each side arrangement, in particular during landing or takeoff on a steep slope.

Such piloting assistance system includes at least one first sensor 30 emitting a first signal relating to the value of a first ground clearance of the first side arrangement 10.

Such a first sensor may be in the form of a lidar sensor, a radio altimeter, or indeed an ultrasound sensor, for example.

Similarly, the aircraft includes at least one second sensor 40 emitting a second signal relating to the value of a second ground clearance of the second side arrangement. Such a second sensor may be in the form of a lidar sensor, a radio altimeter, or indeed an ultrasound sensor, for example.

Each side arrangement may be provided with at least two sensors that are dissimilar and/or disposed in different zones.

Thus, the first side arrangement 10 may be provided with a plurality of first sensors, at least two first sensors being dissimilar and/or positioned differently. Additionally or alternatively, the second side arrangement 20 may be provided with a plurality of second sensors, at least two second sensors being dissimilar and/or positioned differently.

In the example shown in FIG. 1, the first side arrangement 10 is provided with a set of three first sensors 31, 32, 33 disposed laterally on the first nacelle, and, in this configuration, on a face of the first nacelle that faces away from the first flank of the fuselage. At least two first sensors 31, 32, 33 may be dissimilar, e.g. by comprising respectively a radio altimeter and a lidar sensor. In addition, the second side arrangement 20 is provided with a set of three second sensors 41, 42, and 43 disposed laterally on the second nacelle, and, for example, on a face of the second nacelle that faces away from the second flank of the fuselage. At least two second sensors 41, 42, 43 may be dissimilar, e.g. by comprising respectively a radio altimeter and a lidar sensor.

Figure 2:
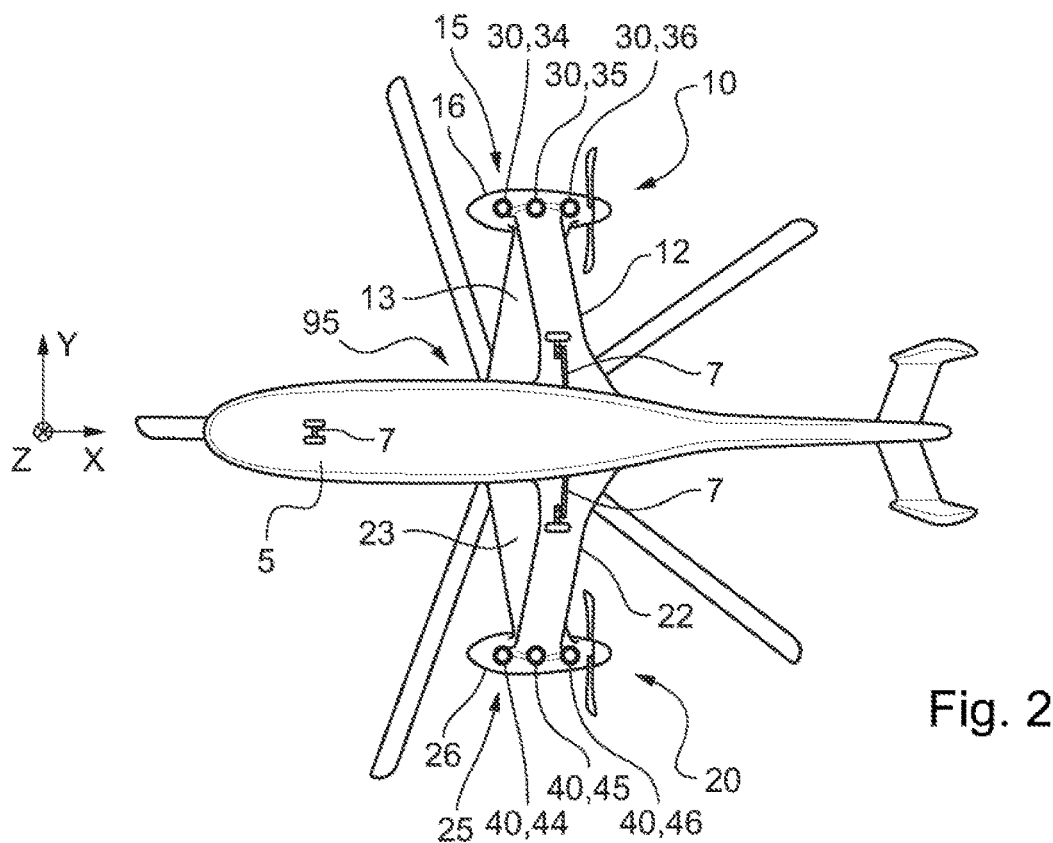
FIG. 2 is a view from below of an aircraft of the invention.

In the example shown in FIG. 2, the first side arrangement 10 is provided with a set of three sensors 34, 35, 36 disposed, in elevation under the first nacelle, and, for example, on a face of the first nacelle that faces the ground during landing or takeoff. At least two first sensors 34, 35, 36 may be dissimilar, e.g. by comprising respectively a radio altimeter and a lidar sensor. In addition, the second side arrangement 20 is provided with a set of three second sensors 44, 45, and 46 disposed in elevation under the second nacelle, and, for example, on a face of the second nacelle that faces the ground during landing or takeoff. At least two second sensors 44, 45, 46 may be dissimilar, e.g. by comprising respectively a radio altimeter and a liar sensor.

Figure 3:
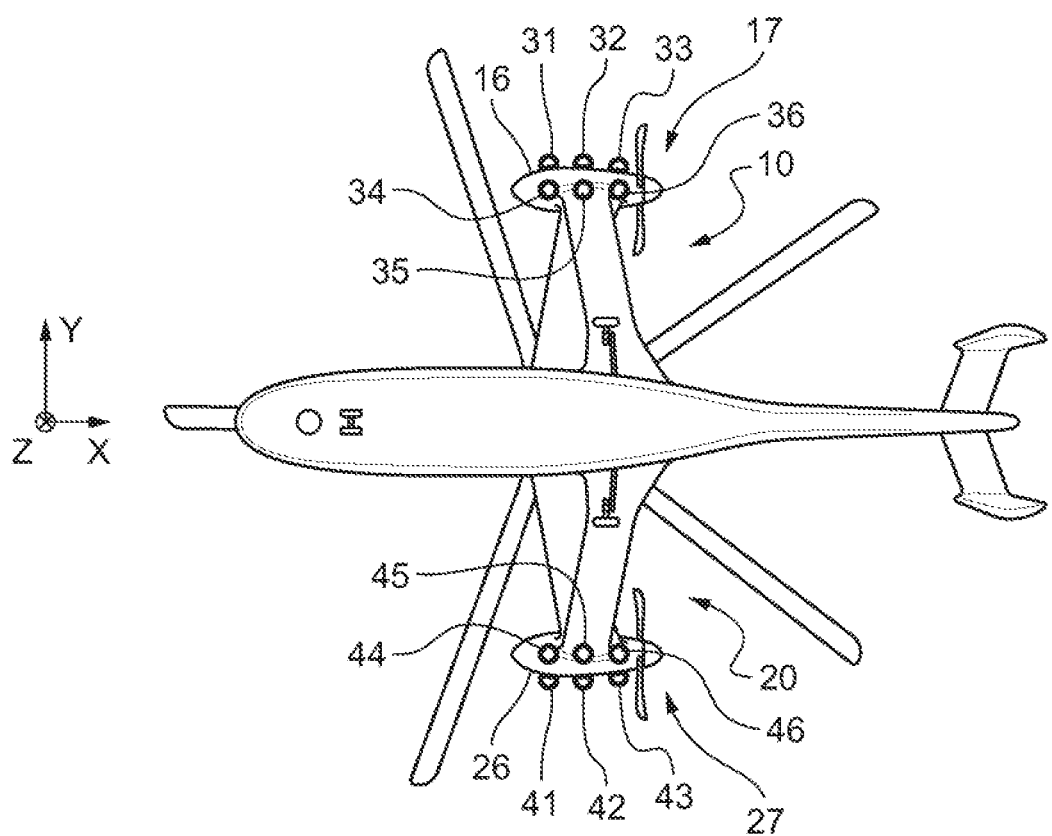
FIG. 3 is a view from below of an aircraft of the invention.

In the example shown in FIG. 3, the first side arrangement 10 is provided with a set of three first sensors 31, 32, and 33 disposed laterally on the first nacelle as shown in FIG. 1, and with a set of three first sensors 34, 35, and 36 disposed in elevation under the first nacelle as shown in FIG. 2. The second side arrangement 20 is provided with a set of three second sensors 41, 42, 43 disposed laterally on the second nacelle as shown in FIG. 1 and with a set of three second sensors 44, 45, 46 disposed in elevation under the second nacelle as shown in FIG. 2.

Other configurations are possible. For example, one or more sensors may be disposed on a fixed wing arrangement and, for example, on a face of a fixed wing arrangement that faces the ground during landing or takeoff.

When propellers are present, the sensors may be situated in the vicinity of the propeller so as to be representative of a minimum ground clearance of the propeller to within a correction coefficient. Said correction coefficient may correspond to the height between the sensor and the low point of the propeller.

Figure 4:
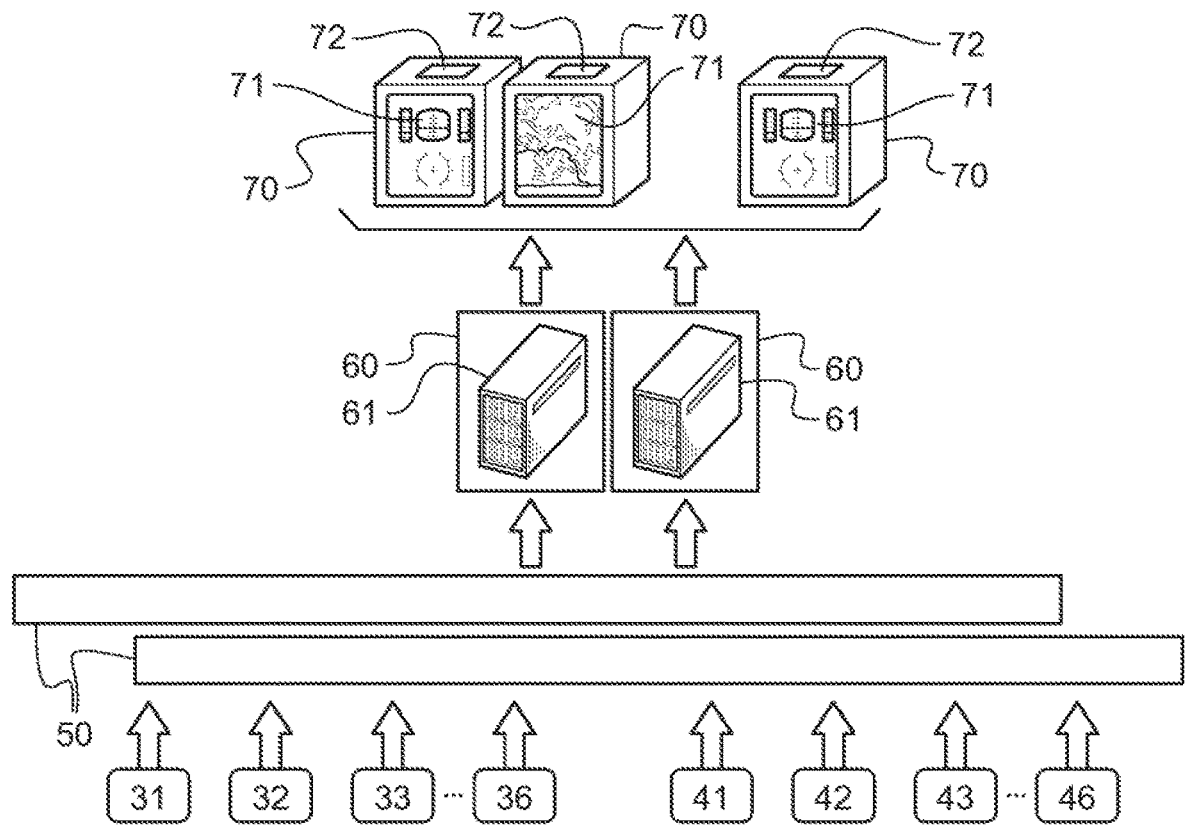
FIG. 4 is a diagram showing an assistance system applying the method of the invention.

In another aspect, and with reference to FIG. 4, the assistance system includes at least one computer 60 in wired or wireless communication with at least one screen 71 and with each first sensor and with each second sensor.

For example, each first sensor and each second sensor are connected to at least one communications system 50, each computer 60 being connected to said communications system 50. A communications system 50 may be in the form of a digital network and, for example, of a CAN bus, of an Ethernet network, etc.

In the example shown in FIG. 4, the assistance system may include at least two computers 60 and at least two communications systems 50 for backup reasons.

Each computer 60 may comprise one or more computer units 61, 72. Each computer unit may, for example, comprise at least one processor and at least one memory, at least one integrated circuit, at least one programmable system, and at least one logic circuit, these examples not limiting the scope given to the expression "computer unit".

In the example used, a computer 50 has a central computer unit 61 and a remote computer unit that is mounted in a screen 71. For example, a remote computer unit and the associated screen form a multi-function screen 70 known as a "Multi-Function Display" (MFD).

This assistance system, and in particular the computer, is configured to apply the method of the invention.

In addition, the assistance system may further include a member that is controllable by the pilot to initiate an assistance phase and for a sensor suitable for signaling that an undercarriage is deployed, such as a position sensor and/or a sensor measuring a height or an overall altitude of the aircraft, such as a Global Positioning System (GPS) or an air data system, for example. In addition, the computer may be connected to at least one, sensor transmitting a signal indicating whether an undercarriage is compressed or non-compressed.

Figure 5:
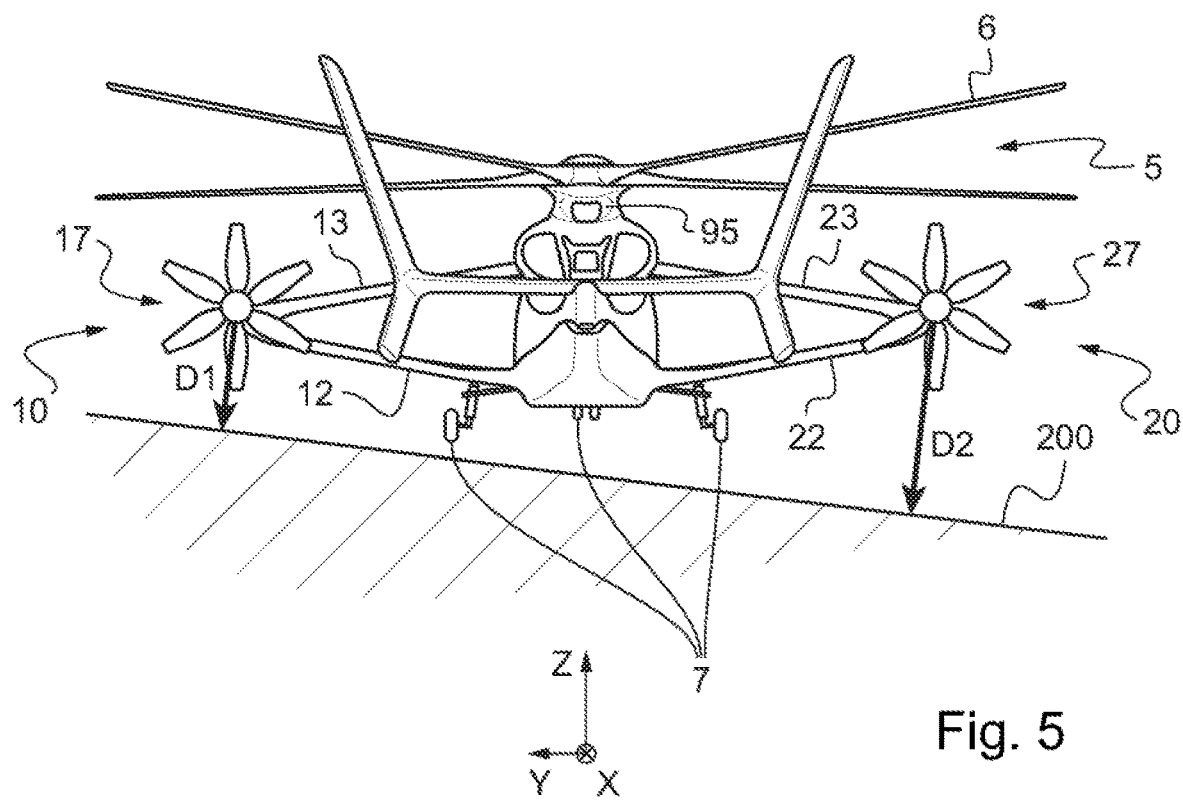
FIG. 5 is a diagram explaining the method of the invention.

With reference to FIG. 5, at each instant, a first ground clearance D1 vertically separates a first sensor from the ground 200 and a second ground clearance D2 vertically separates a second sensor from the ground 200. In the example, the first distance D1 and the second distance D2 are different due to the ground sloping relative, to a horizontal plane.

Figure 6:
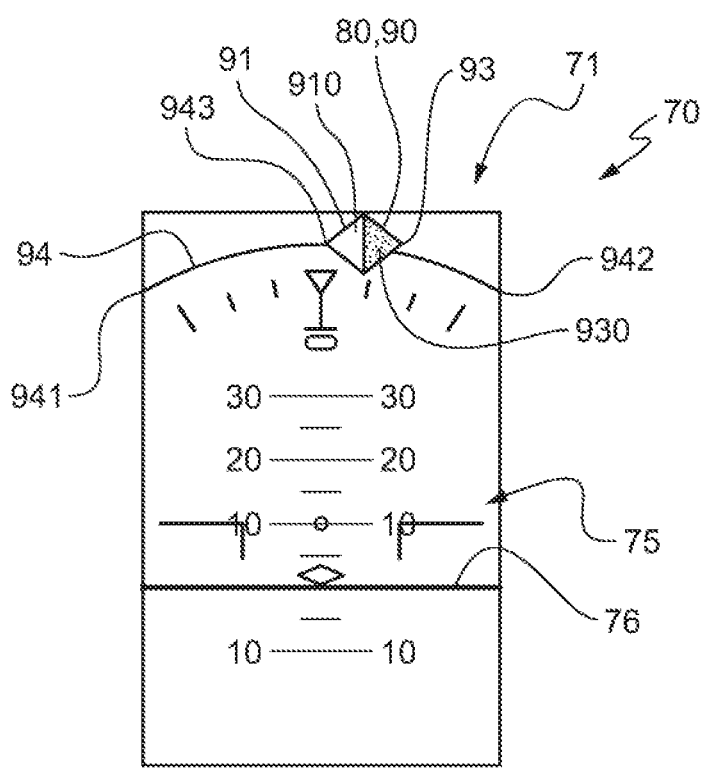
FIG. 6 is a diagram explaining the method of the invention.

With reference to FIG. 6, the method includes steps for displaying information relating to the first distance D1 and to the second distance D2 at least during an assistance phase. The as phase may be a phase triggered when conditions are satisfied, e.g. during a landing phase and/or a takeoff phase, or indeed, in particular, when an undercarriage is deployed and below a certain height or when a control is activated. The method may also be active continuously.

In the method, the value of the first ground clearance D1 of the first side arrangement 10 and the value of the second ground clearance D2 of the second side arrangement 20 are measured.

Each first sensor 31, 32, 33, 34, 35, 36 then acquires a first measurement signal carrying a first piece of information that is an image of the value of the first ground clearance. Similarly, each second sensor 41, 42, 43, 44, 45, acquires a second measurement signal that carries a second piece of information that is an image of the value of the second ground clearance.

On the basis of the first measurement and second measurement signals, each computer is configured to determine the value of the first ground clearance and the value of the second ground clearance.

Optionally, in a first stage, the first signals and the second signals are processed by the sensors themselves or else they are transmitted to each computer for processing.

Regardless of which member performs the processing, the first measurement signals and the second measurement signals are, during such processing, conditioned by usual signal processing methods.

Optionally, after conditioning, the first measurement signals and the second measurement signals are digitized.

When a single first sensor is present, the computer may determine directly the value of the first ground clearance on the basis of the received signal. For example, the computer includes a table giving the ground clearance value in meters as a function of the received binary code. Similarly, when a single second sensor is present, the computer may determine directly the value of the second ground clearance on the basis of the received signal.

Conversely, when a plurality of first sensors and a plurality of second sensors are present, the computer may consolidate the received data via a voting method for obtaining respectively the value of the first ground clearance and the value of the second ground clearance to be selected.

For example, the computer converts each received piece of data into a value expressed in meters and uses a voting method to deduce from it the value of the first ground clearance and the value of the second ground clearance to be selected.

Independently of the manner of obtaining the value of the first ground clearance D1 and of the value of the second ground clearance D2, the method includes a step of generating at least one assistance symbol 80 and of displaying said at least one assistance symbol on a screen 71. Each symbol 80 varies on an order from the computer as a function, in particular, of the variation in said value of the first ground clearance and/or of the variation in said value of the second ground clearance, or indeed as function of the compressed state or non-compressed state of an undercarriage.

For example, the central computer unit communicates the value of the first ground clearance D1 and the value of the second ground clearance D2 to a remote computer unit. The remote computer unit encodes the value of the first ground clearance D1 and the value of the second ground clearance D2 so as to display each requested symbol on the screen 71, optionally while taking into consideration that compressed state or non-compressed state of an undercarriage.

Optionally, displaying each assistance symbol 80 is dependent on detection that a retractable undercarriage 7 of the aircraft 1 is deployed by scrutinizing a signal from a sensor for sensing deployment of the undercarriage, and/or dependent on detection that the value of the first ground clearance is less than a threshold height or that the second ground clearance is less than the threshold height.

In the example shown in FIG. 6, the computer may determine a roll set value to be complied with, e.g. so that the value of the first ground clearance and the value of the second ground clearance, are identical, e.g. by applying a law or relationship that is stored in a memory.

An assistance symbol may the comprise a central symbol 90 that moves along a reference segment 94. The position of this central symbol 90 along the reference segment reflects the roll set value and thus does indeed vary as a function of the value of the first ground clearance D1 and of the value of the second ground clearance D2.

For example, the reference segment is in the shape of a circular arc.

The reference segment extends from a distal end 941 to a proximal end 942 while going through a point 943. The distal end 941 is reached by the central system 90 to illustrate a maximum roll set value in a first roll direction. A proximal end 942 is reached by the central symbol to illustrate a maximum roll set value in a second roll direction and the point 943 is reached by the central symbol 90 to illustrate a zero roll set value.

The central symbol 90 may comprise a first portion 91 and a second portion 93 respectively representing the first ground clearance and the second ground clearance. In the example shown, the central symbol 90 is diamond-shaped, the first portion 91 and the second portion 93 being in the shape of two triangles having a common base.

The background 910 of the first portion 91 and the background 930 of the second portion 93 may vary as a function respectively of the value of the first ground clearance and of the value of the second ground clearance.

In an example using the color charter for aircraft alarms, the color of each background is determined as a function of a high height threshold and of a low height threshold that is less than the high height threshold. Thus, each background may have a green color when the associated ground clearance is at the high height threshold, an amber color when the associated ground clearance is less than the high height threshold and the greater than low height threshold, and a red color when the associated ground clearance is less than the low height threshold. The color of a background may also vary progressively from green to red.

Figure 7:
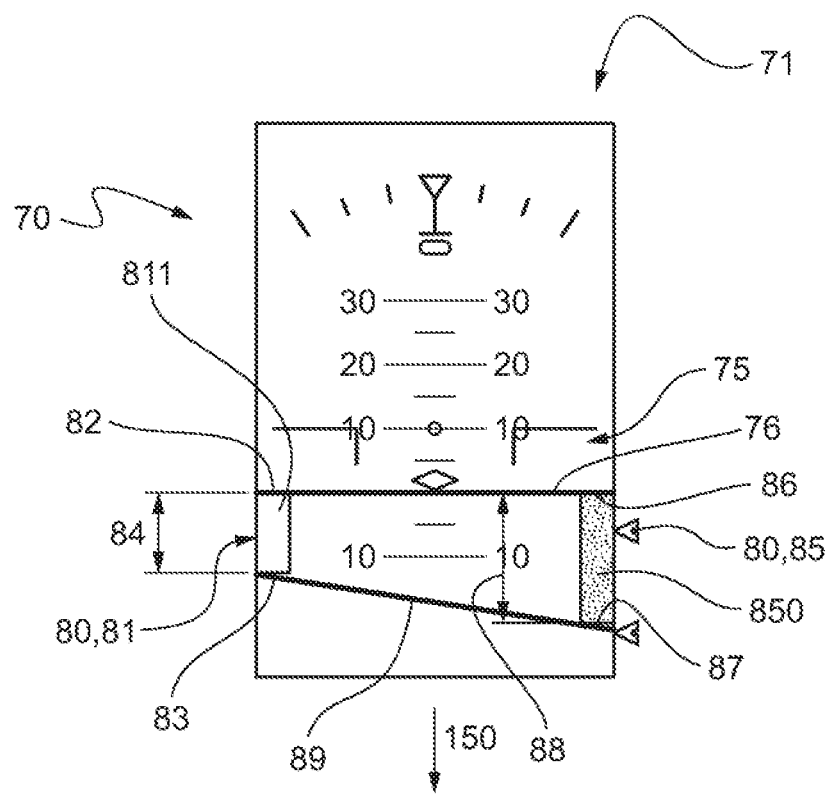
FIG. 7 is a diagram explaining the method of the invention.

In the example of FIG. 7, an assistance symbol may comprise a first symbol 81 conveying the value of the first ground clearance and a second symbol 85 conveying the value of the second ground clearance, with the ground clearances being displayed on a artificial horizon 75. For example, the first symbol and the second symbol are in the form of segments or indeed of bars as shown in FIG. 7.

Thus, the first symbol 81 may extend in a direction 150 from a horizon segment 76 representing the horizon on the artificial horizon 75 to a first end 83 over a first length 84 that is a function of the value of the first ground clearance. Similarly, the second symbol 85 extends in the same direction, e.g. parallel to the first symbol 81, from the first horizon segment 76 to a second end 87 over a second length 88 that is a function of the value of the second ground clearance.

Like the central symbol, the first symbol 81 may have a background 811 that varies as a function of the value of the first ground clearance, and the second symbol 85 may have a background 850 that varies as a function of the value of the second ground clearance.

Optionally, a ground segment 89 is generated by the computer and displayed to show the ground diagrammatically to a pilot. This ground segment 89 connects the first end 83 to the second end 87.

Figure 8:
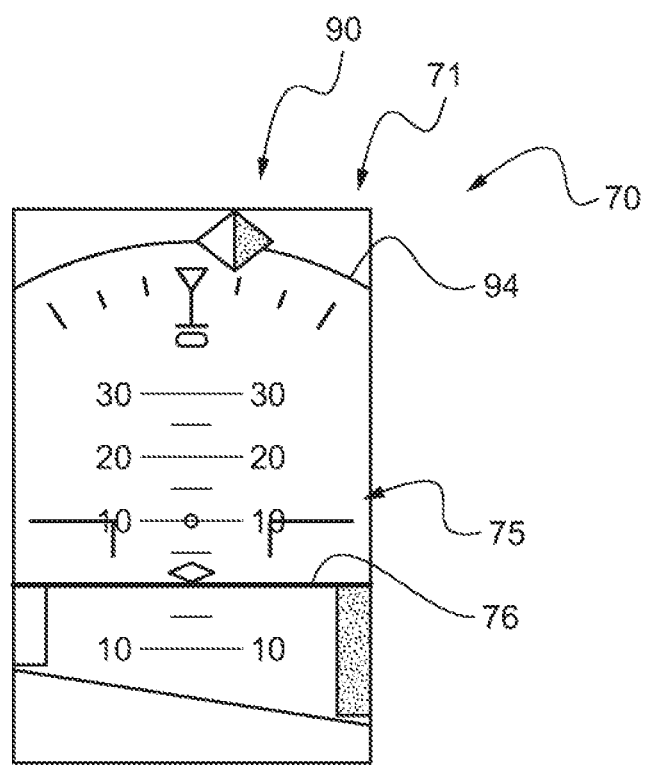
FIG. 8 is a diagram explaining the method of the invention.

In the variant shown in FIG. 8, the central symbol 90 and its reference segment 94, and the first symbol 81, the second symbol 85, and indeed the ground segment 88 are generated and displayed.

Naturally, the present invention can be the subject or numerous variants as to its implementation. Although several embodiments and implementations are described, it should readily be understood that it is not conceivable to identify exhaustively all possible embodiments and implementations. It is naturally possible to envisage replacing any of the means described by equivalent means without going beyond the ambit of the present invention.

What is claimed is:

1. A method of assisting in piloting an aircraft having a fuselage that extends longitudinally from a nose towards a rear end, the aircraft having a first side arrangement and a second side arrangement, which first side arrangement and second side arrangement are disposed laterally on respective sides of the fuselage, and participate in the lift and/or propulsion of the aircraft;
wherein, during an assistance phase, the method includes the following steps:
measuring, with a first sensor, a value of a first ground clearance of the first side arrangement, the first ground clearance being a first distance separating the first side arrangement and the ground, and measuring, with a second sensor, a value of a second ground clearance of the second side arrangement, the second ground clearance being a second distance separating the second side arrangement and the ground; and
displaying on a screen at least one symbol that varies as a function of the variation in the value of the first ground clearance and/or of the variation in the value of the second ground clearance.

2. The method according to claim 1,
wherein, for measuring the value of the first ground clearance and the value of the second ground clearance, the method includes the following steps:
acquiring at least one first measurement signal with the first sensor, which first measurement signal carries a first piece of information that is an image of the value of the first ground clearance, and acquiring at least one second measurement signal with the second sensor, which second measurement signal carries a second piece of information that is an image of the value of the second ground clearance; and
determining the value of the first ground clearance by processing the first measurement signal(s), and determining the value of the second ground clearance by processing the second measurement signal(s).

3. The method according to claim 1,
wherein, for measuring the value of the first ground clearance and the value of the second ground clearance, the method includes the following steps:
acquiring a plurality of first measurement signals with a plurality of first sensors of the first ground clearance, and acquiring a plurality of second measurement signals with a plurality of second sensors of the second ground clearance;
conditioning the plurality of first measurement signals and the second measurement signals;
consolidating the plurality of first measurement signals and the plurality of second measurement signals following the conditioning via a voting method for obtaining respectively the value of the first ground clearance and the value of the second ground clearance.

4. The method according to claim 1,
wherein the aircraft is provided with a plurality of first sensors containing at least two first sensors that are dissimilar and/or disposed in mutually different zones of the first side arrangement, the aircraft being provided with a plurality of second sensors containing at least two second sensors that are dissimilar and/or disposed in mutually different zones of the second side arrangement.

5. The method according to claim 1,
wherein the displaying of the symbol(s) is dependent on detection of at least one of following two events:
detection that a retractable undercarriage of the aircraft is deployed;
detection that the value of the first ground clearance is less than a threshold height or that the second ground clearance is less than the threshold height.

6. The method according to claim 1,
wherein the method includes a step of determining a roll set value to be complied with, the at least one symbol comprising a central symbol that moves along a reference segment, and the positioning of the central symbol along the reference segment being a function of the roll set value.

7. The method according to claim 6,
wherein the central symbol comprises a first portion and a second portion that represent respectively the first ground clearance and the second ground clearance, a background of the first portion and a background of the second portion varying as a function respectively of the value of the first ground clearance and of the value of the second ground clearance.

8. The method according to claim 1,
wherein the at least one symbol comprises a first symbol and a second symbol, the first symbol extending in a direction from a horizon segment representing the horizon of an artificial horizon to a first end over a first length that is a function of the value of the first ground clearance, and the second symbol extending in the direction from the horizon segment to a second end over a second length that is a function of the value of the second ground clearance.

9. The method according to claim 8,
wherein the first symbol has a background that varies as a function of the value of the first ground clearance and the second symbol has a background that varies as a function of the value of the second ground clearance.

10. The method according to claim 8,
wherein the method includes a step of displaying a ground segment connecting the first end to the second end.

11. The method according to claim 1,
wherein, with the aircraft being provided with at least one undercarriage that can be compressed so that it is either in a compressed state or in a non-compressed state, the method includes the following steps:
determining that the at least one undercarriage is in the compressed state or in the non-compressed state; and
assigning to the at least one symbol an appearance that varies while the undercarriage(s) is/are going from the compressed state to the non-compressed state and vice versa.

12. An aircraft having a fuselage that extends longitudinally from a nose towards a rear end, the aircraft having a first side arrangement and a second side arrangement, which first side arrangement and second side arrangement are disposed laterally on respective sides of the fuselage, and each of them participates in the lift and/or propulsion of the aircraft;
wherein the aircraft is provided with at least one first sensor emitting a first signal relating to the value of a first ground clearance of the first side arrangement, the first ground clearance being a first distance separating the first side arrangement and the ground, the aircraft being provided with at least one second sensor emitting a second signal relating to the value of a second ground clearance of the second side arrangement, the second ground clearance being a second distance separating the second side arrangement and the ground, the aircraft being provided with a screen and with a computer, the computer being connected to each first sensor and to each second sensor, and to the screen, and the computer being configured to transmit a control signal to the screen to display at least one symbol that varies as a function of the variation in the value of the first ground clearance and/or of the variation in the value of the second ground clearance.

13. The aircraft according to claim 12, wherein the aircraft is provided with at least two of the at least first sensors of the at least one first sensor that are dissimilar and/or disposed in mutually different zones of the first side arrangement, the aircraft being provided with at least two of the at least second sensors of the at least one second sensor that are dissimilar and/or disposed in mutually different zones of the second side arrangement.

14. The aircraft according to claim 12, wherein at least one first sensor or at least one second sensor comprises a lidar sensor or a radio altimeter.

15. The aircraft according to claim 12, wherein the aircraft is provided with a retractable undercarriage.

16. The aircraft according to claim 12, wherein the first side arrangement comprises a first fixed wing arrangement carrying a first propeller, the second side arrangement comprising a second fixed wing arrangement carrying a second propeller.

17. The method according to claim 1, wherein the at least one symbol varies as a function of the variation in the value of the first ground clearance and of the variation in the value of the second ground clearance.

18. The aircraft according to claim 12, wherein the at least one symbol varies as a function of the variation in the value of the first ground clearance and of the variation in the value of the second ground clearance.

* * * * *